US011976564B1

(12) United States Patent
Thurston et al.

(10) Patent No.: US 11,976,564 B1
(45) Date of Patent: May 7, 2024

(54) SPLINED BALANCE WEIGHT FOR ROTATING COMPONENTS IN GAS TURBINE ENGINES

(71) Applicant: Rolls-Royce North American Technologies Inc., Indianapolis, IN (US)

(72) Inventors: Eric Thurston, Indianapolis, IN (US); Jonathan Acker, Indianapolis, IN (US); Eric Engebretsen, Indianapolis, IN (US); Aaron Weishaar, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/128,739

(22) Filed: Mar. 30, 2023

(51) Int. Cl.
*F01D 5/02* (2006.01)
*F01D 5/10* (2006.01)

(52) U.S. Cl.
CPC ............... *F01D 5/027* (2013.01); *F01D 5/10* (2013.01); *F05D 2220/32* (2013.01); *F05D 2230/60* (2013.01); *F05D 2240/24* (2013.01); *F05D 2260/96* (2013.01)

(58) Field of Classification Search
CPC ........ F01D 5/027; F01D 5/10; F05D 2220/32; F05D 2240/24; F05D 2260/96
See application file for complete search history.

(56) References Cited

U.S. PATENT DOCUMENTS 4,059,972 A * 11/1977 Beam, Jr. ................ F01D 5/027 464/180
4,177,692 A * 12/1979 Irwin .................... F16F 15/322 464/180
4,220,055 A 9/1980 Dubois et al.
4,926,710 A 5/1990 Novotny
5,582,077 A * 12/1996 Agram .................... F16F 15/32 403/348
7,347,672 B2 3/2008 Bertrand et al.
8,186,954 B2 5/2012 Lee et al.
8,668,457 B2 3/2014 Juh
8,888,458 B2 11/2014 Billings et al.
9,297,258 B2 3/2016 Woods et al.
9,909,424 B2 3/2018 Douady et al.
10,544,678 B2 1/2020 Espinoza
10,557,356 B2 2/2020 Wines et al.
10,738,639 B2 8/2020 Porter et al.
11,053,798 B2 * 7/2021 Juh ......................... F01D 25/06
2011/0044816 A1 2/2011 Lecuyer et al.
2011/0078901 A1 4/2011 Glasspoole et al.
2014/0140849 A1 5/2014 Muscat et al.
(Continued)

FOREIGN PATENT DOCUMENTS

DE 102017207283 10/2018
JP 4949191 6/2012

*Primary Examiner* — Justin D Seabe
*Assistant Examiner* — Aye S Htay
(74) *Attorney, Agent, or Firm* — Barnes & Thornburg LLP

(57) ABSTRACT

A rotor assembly includes a first component, a second component, and a splined balance weight. The first component is arranged circumferentially around a central axis. The second component is arranged circumferentially around the central axis. The splined balance weight is located radially between the first component and the second component.

18 Claims, 5 Drawing Sheets

(56) References Cited

U.S. PATENT DOCUMENTS

| | | | | |
|---|---|---|---|---|
| 2017/0074104 | A1 | 3/2017 | Stone | |
| 2017/0370224 | A1* | 12/2017 | Porter | F01D 5/026 |
| 2022/0235662 | A1 | 7/2022 | Hagan et al. | |

* cited by examiner

SPLINED BALANCE WEIGHT FOR ROTATING COMPONENTS IN GAS TURBINE ENGINES

FIELD OF THE DISCLOSURE

The present disclosure relates generally to gas turbine engines, and more specifically to rotor assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines also typically include a rotor assembly coupling the turbine with the compressor and/or a fan. The rotor assembly includes rotating components. Some gas turbine engines require balancing of the rotor assembly to adjust a mass distribution of the high speed rotating components. Some rotor assembly designs must be wholly disassembled and reassembled for balancing which may be labor and time intensive.

SUMMARY

The present disclosure may comprise one or more of the following features and combinations thereof.

A rotor assembly adapted for a gas turbine engine may comprise a first component, a second component, and a splined balance weight. The first component may be arranged circumferentially around a central axis. The first component may have a first band and a plurality of first splines. The first band may extend at least partway circumferentially about the central axis. The plurality of first splines may extend radially from the first band. The second component may be arranged circumferentially around the central axis and located radially inward of the first component. The second component may have a second band and a plurality of second splines. The second band may extend at least partway circumferentially about the central axis. The plurality of second splines may extend radially from the second component and interlock with the plurality of first splines of the first component so that torque is transferred between the second component and the first component during rotation of the rotor assembly.

In some embodiments, the splined balance weight may be located radially between the first component and the second component and configured to balance a weight distribution of the rotor assembly. The splined balance weight may include a weight body and a spline tooth. The weight body may extend circumferentially partway about the central axis. The spline tooth may extend radially from the weight body and into the plurality of first splines to interlock the splined balance weight with the first component and prevent circumferential movement of the splined balance weight in relation to the first component and the second component.

In some embodiments, a gap may be formed radially between the first band of the first component and the second band of the second component. A size of the gap may allow the splined balance weight to be separated from the first component and the second component while the first component and the second component are interlocked via the plurality of first splines and the plurality of second splines.

In some embodiments, the plurality of first splines of the first component and the plurality of second splines of the second component may be provided circumferentially entirely around the central axis. The gap may extend circumferentially entirely around the central axis. The splined balance weight may be discrete and rigid. A radial inner surface of the weight body may engage the second component while the spline tooth is received by the plurality of first splines.

In some embodiments, the weight body of the splined balance weight may be an arcuate shape that matches an arc formed by the first band of the first component and an arc formed by the second band of the second component. The rotor assembly may further comprise a retention ring spaced apart axially from the plurality of first splines to locate the splined balance weight axially between a portion of the second component and the retention ring to block axial movement of the splined balance weight.

In some embodiments, the second component may include a shoulder extending radially outward from the second band and the shoulder may abut an axial face of the splined balance weight. The splined balance weight may be axially located between the shoulder of the second component and the retention ring. The weight body of the splined balance weight may have a continuous radial inner surface that is configured to slide axially along a continuous radial outer surface of the second component.

In some embodiments, the plurality of first splines of the first component may extend a first axial distance. The plurality of second splines of the second component may extend a second axial distance. The first axial distance may be greater than the second axial distance.

According to another aspect of the present disclosure, a rotor assembly adapted for a gas turbine engine may comprise a first component, a second component, and a splined balance weight. The first component may be arranged circumferentially around a central axis. The first component may have a first band and a plurality of first splines that extend radially from the first band. The second component may be arranged circumferentially around the central axis. The second component may have a second band and a plurality of second splines that extend radially from the second band and interlock with the plurality of first splines of the first component.

In some embodiments, the splined balance weight may be located radially between the first component and the second component. The splined balance weight may include a weight body and a spline tooth. The spline tooth may extend radially from the weight body and into one of the plurality of first splines and the plurality of second splines.

In some embodiments, a gap may be formed radially between the first band of the first component and the second band of the second component. A size of the gap may allow the splined balance weight to be separated from the first component and the second component while the first component and the second component are interlocked via the plurality of first splines and the plurality of second splines.

In some embodiments, the plurality of first splines of the first component and the plurality of second splines of the second component may be provided entirely around the central axis. The gap may extend circumferentially entirely around the central axis. The splined balance weight may be discrete and rigid. A radial inner surface of the weight body may engage the second component while the spline tooth is received by one of the plurality of first splines and the plurality of second splines.

In some embodiments, the weight body of the splined balance weight may be an arcuate shape that matches an arc formed by the first band of the first component and an arc formed by the second band of the second component. The rotor assembly may further comprise a retention ring spaced apart axially from the plurality of first splines to locate the splined balance weight axially between a portion of the second component and the retention ring to block axial movement of the splined balance weight.

In some embodiments, the second component may include a shoulder extending radially outward from the second band and the shoulder may abut the splined balance weight. The splined balance weight may be axially located between the shoulder of the second component and the retention ring. The weight body of the splined balance weight may have a continuous radial inner surface that is configured to slide axially along a continuous radial outer surface of the second component.

In some embodiments, the plurality of first splines of the first component may extend a first axial distance. The plurality of second splines of the second component may extend a second axial distance. The first axial distance may be greater than the second axial distance.

A method may comprise arranging a first component of a rotor assembly of a gas turbine engine circumferentially around a central axis. The first component may have a first band and a plurality of first splines that extend radially from the first band.

In some embodiments, the method may comprise arranging a second component of the rotor assembly circumferentially around the central axis. The second component may have a second band and a plurality of second splines that extend radially from the second band.

In some embodiments, the method may comprise interlocking the plurality of first splines of the first component with the plurality of second splines of the second component. The method may comprise determining a balance offset of the rotor assembly of the gas turbine engine.

In some embodiments, the method may comprise providing a splined balance weight. The splined balance weight may include a weight body and a spline tooth extending radially from the weight body.

In some embodiments, the method may comprise locating the splined balance weight between the first component and the second component at a selected first circumferential position based on the balance offset of the rotor assembly. The method may comprise interlocking the spline tooth of the splined balance weight with one of the plurality of first splines and the plurality of second splines.

In some embodiments, the method may further comprise positioning a retention ring adjacent to the splined balance weight to block the splined balance weight axially between a portion of the second component and the retention ring. The method may further comprise separating completely the splined balance weight from the first component and the second component without separating the interlocked plurality of first splines and the plurality of second splines.

In some embodiments, the method may further comprise, after the separating step, at least one of (i) locating the splined balance weight between the first component and the second component at a selected second circumferential position different from the first circumferential position, (ii) removing or adding material to the splined balance weight and thereafter locating the splined balance weight between the first component and the second component, and (iii) providing a second splined balance weight different from the first splined balance weight and locating the second splined balance weight between the first component and the second component.

These and other features of the present disclosure will become more apparent from the following description of the illustrative embodiments.

DETAILED DESCRIPTION OF THE DRAWINGS

Figure 1:
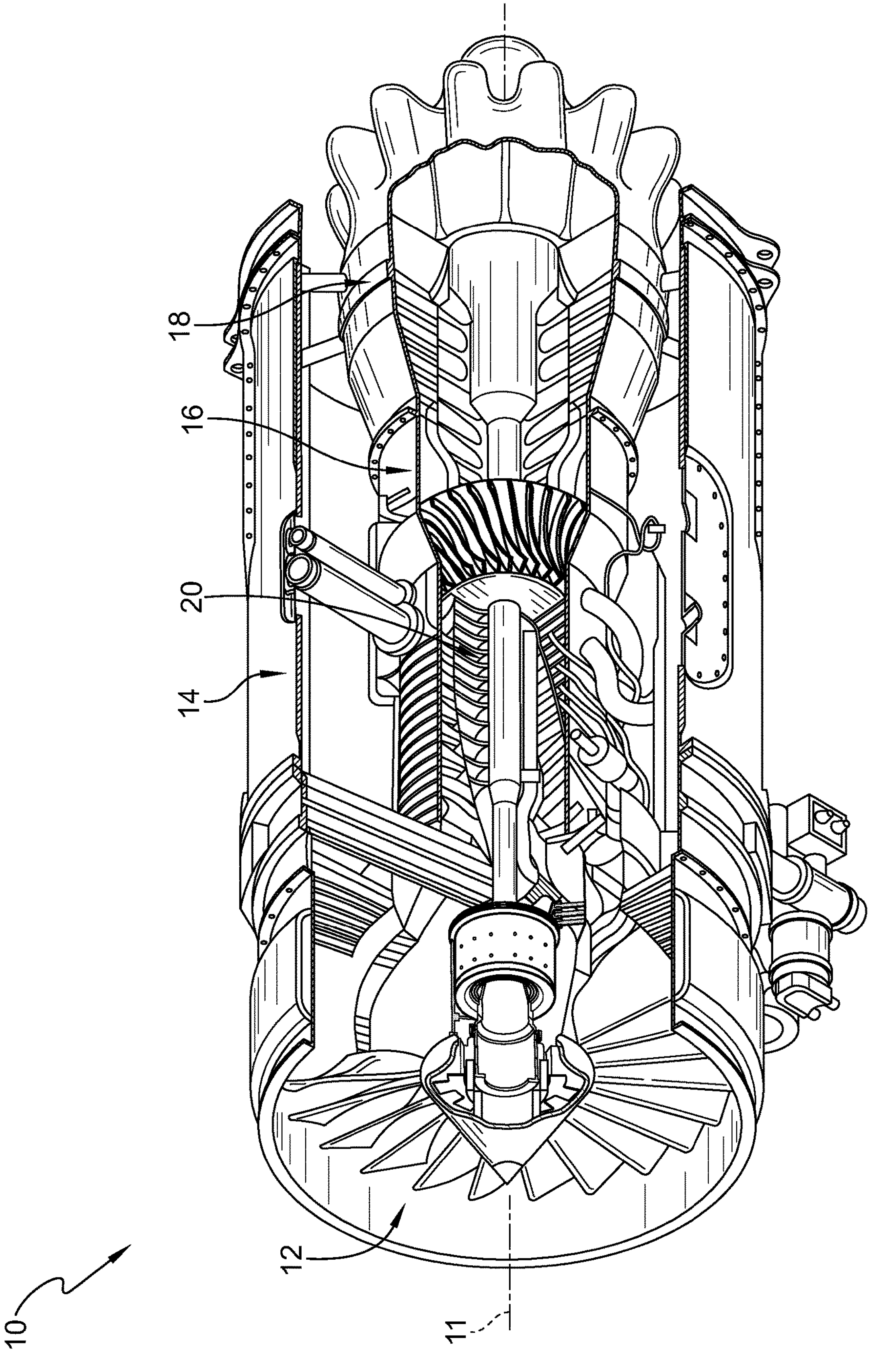
FIG. 1 is a cutaway view of a gas turbine engine that includes a fan, a compressor, a combustor downstream of the compressor, and a turbine downstream of the combustor.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16 located downstream of the compressor 14, a turbine 18 located downstream of the combustor 16 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

Sections of the gas turbine engine 10, such as the fan 12, compressor 14, and turbine 18, include rotor assemblies 20 that rotate about the central axis 11. Rotor assemblies 20 may include, for example, bladed wheel assemblies. The rotor assemblies 20 may be balanced during manufacture and/or assembly. Conventional rotor balancing may include removing mass from a component or adding mass via layer deposition, bolts, etc. The present disclosure provides a rotor assembly 20 having a balance weight that interlocks with spline features to allow the balance weight to be moved circumferentially on the assembly, made with a desired weight, and/or machined to a desired weight during the balancing process, etc. to allow for improved tolerances and easier balancing of the rotor assembly 20.

Figure 2:
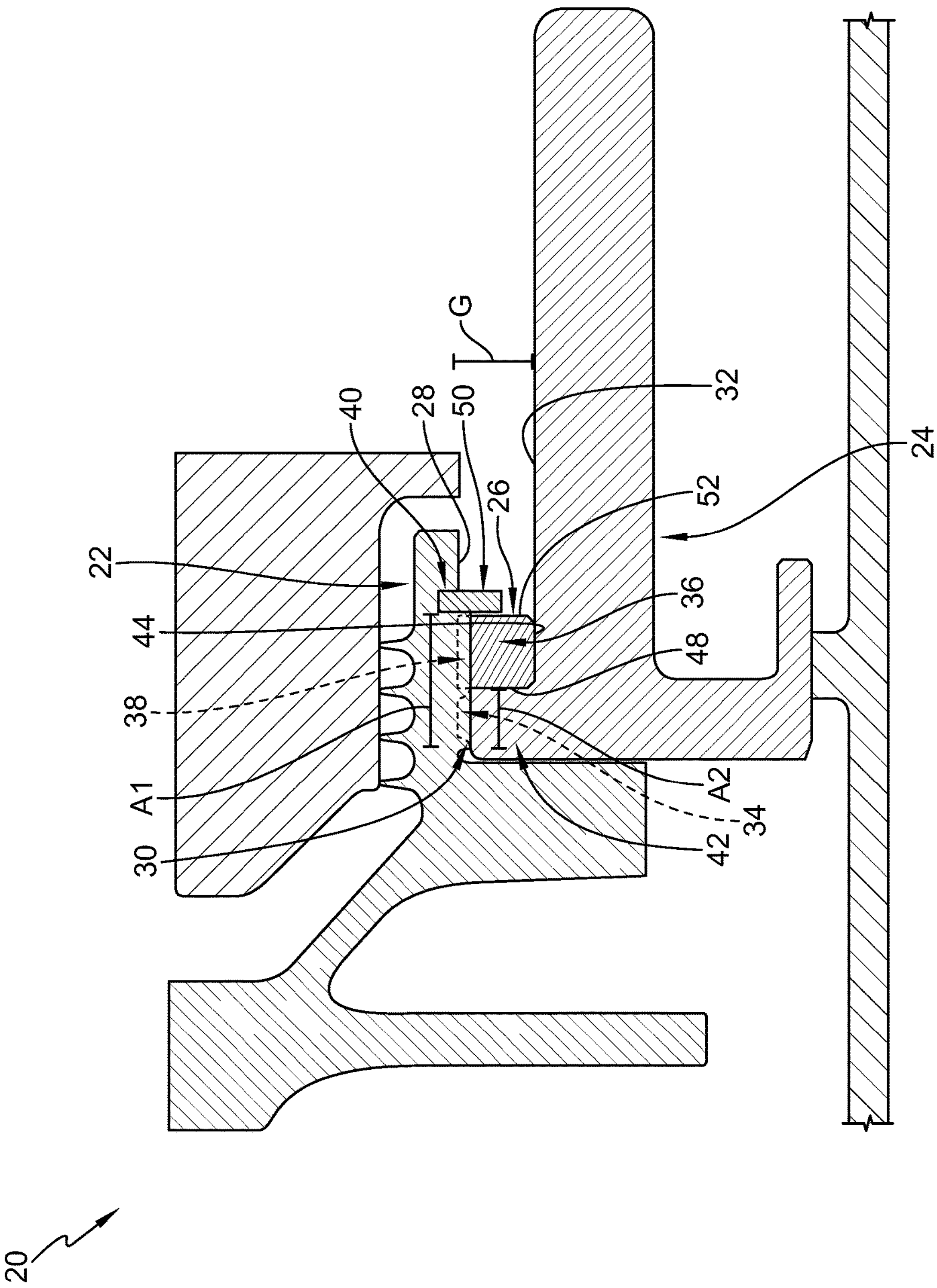
FIG. 2 is a cross-sectional view of a rotor assembly of the gas turbine engine of FIG. 1, showing the rotor assembly includes a first component having a first band that extends at least partway circumferentially about the central axis and a plurality of first splines that extend radially from the first band, a second component having a second band that extends at least partway circumferentially about the central axis and a plurality of second splines that extend radially from the second component and interlock with the plurality of first splines of the first component, and a splined balance weight that interlocks with the first component and prevent circumferential movement of the splined balance weight in relation to the first component and the second component.
Figure 3:
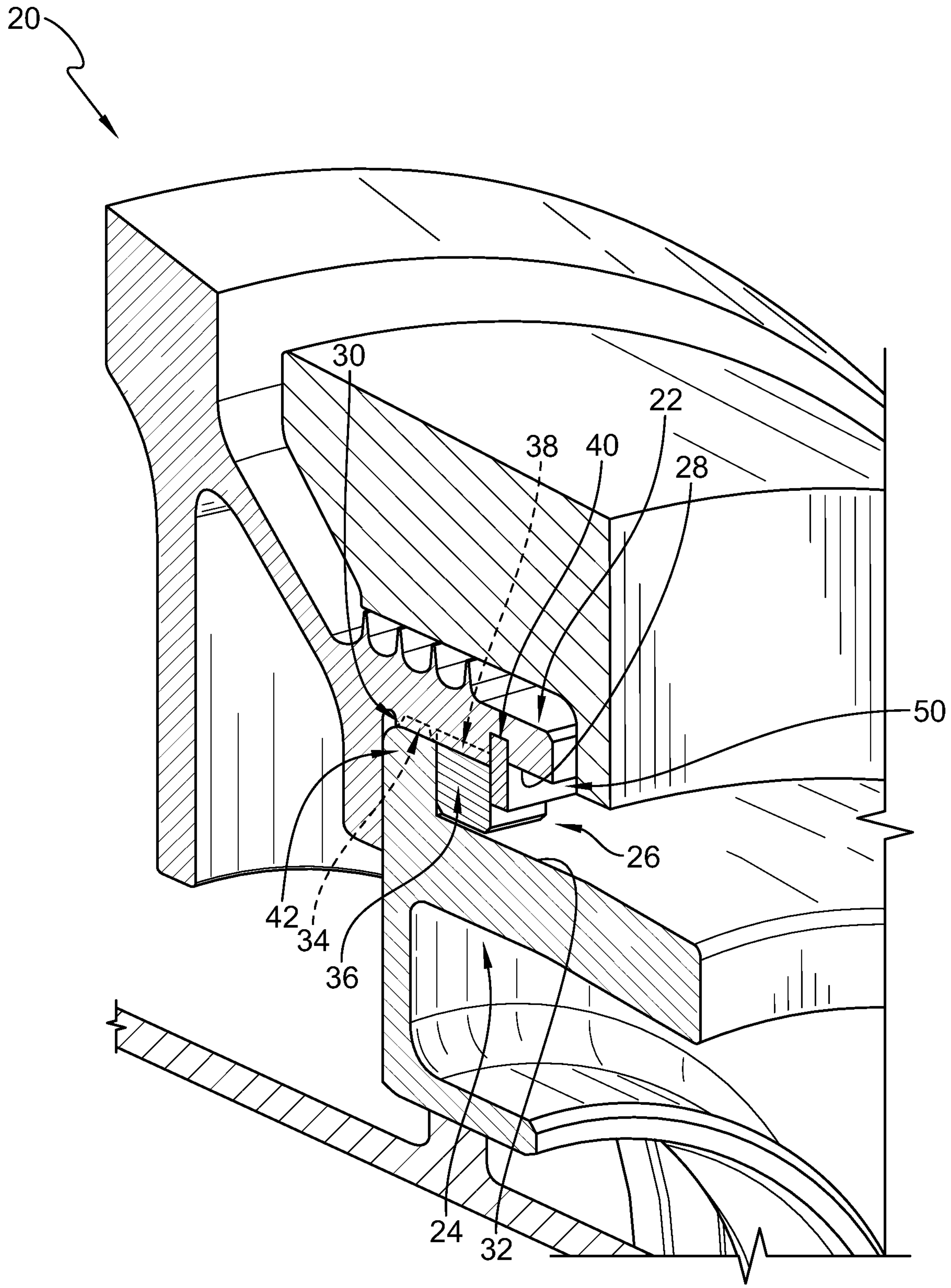
FIG. 3 is a perspective view of the rotor assembly of FIG. 2, showing the first component interlocked with the second component, the splined balance weight interlocked with the first component, and further showing that the rotor assembly includes a retention ring spaced apart axially from the plurality of first splines to locate the splined balance weight axially between a portion of the second component and the retention ring to block axial movement of the splined balance weight.

The rotor assembly 20 of the present disclosure includes a first component 22, a second component 24, and a splined balance weight 26 as shown in FIGS. 2 and 3. The first component 22 is arranged circumferentially around the central axis 11. The second component 24 is arranged circumferentially around the central axis 11 and is located radially inward of the first component 22. The splined balance weight 26 is located radially between the first component 22 and the second component 24 and is configured to balance a weight distribution of the rotor assembly 20. The first component 22 may be a bladed rotor assembly and the second component 24 may be a rotor shaft or a disk coupling the first component 22 to a rotor shaft. Likewise, the first component 22 may be a rotor shaft or a disk and the second component 24 may be a bladed rotor assembly.

The first component 22 includes a first band 28 and a plurality of first splines 30 as shown in FIGS. 2 and 3. The first band 28 extends at least partway circumferentially about the central axis 11. The plurality of first splines 30 extend radially from the first band 28. In the illustrative embodiment, the first splines 30 extend radially inward toward the central axis 11.

Figure 4:
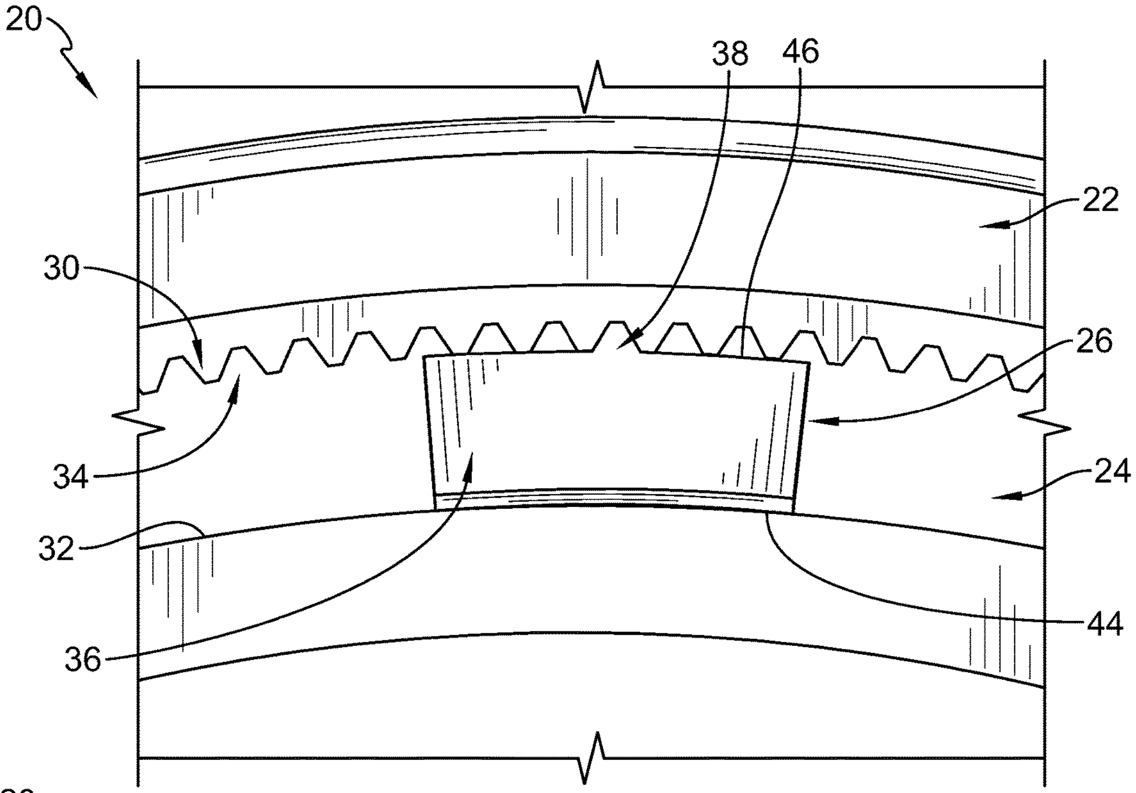
FIG. 4 is an elevation view of the rotor assembly of FIG. 3 showing that the plurality of first splines of the first component interlock with the plurality of second splines of the second component, and further showing that the spline tooth of the splined body weight interlocks with the plurality of first splines of the first component.
Figure 5:
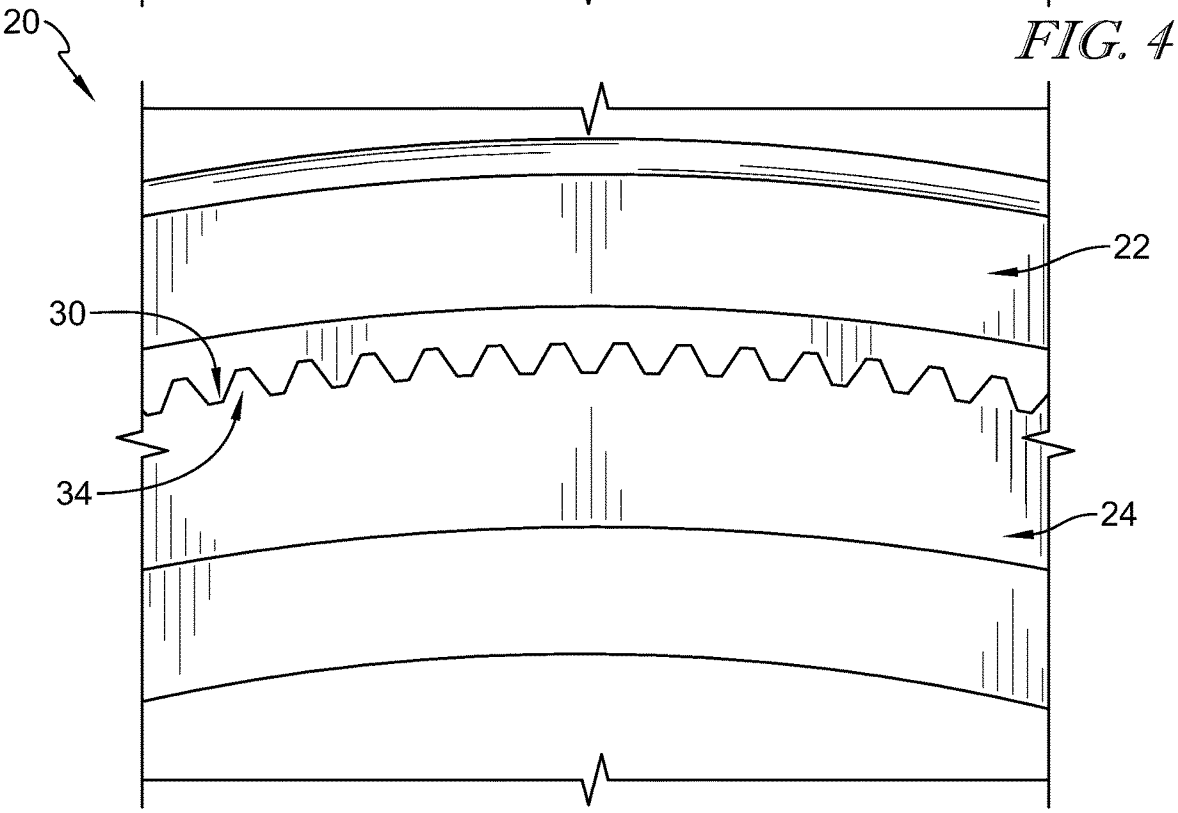
FIG. 5 is an elevation view of the rotor assembly similar to the view of FIG. 4 with the splined balance weight removed from the rotor assembly, suggesting that the plurality of first splines of the first component and the plurality of second splines of the second component are provided circumferentially entirely around the central axis.

The second component 24 includes a second band 32 and a plurality of second splines 34 as shown in FIGS. 2 and 3. The second band 32 extends at least partway circumferentially about the central axis 11. The plurality of second splines 34 extend radially from the second component 24 and interlock with the plurality of first splines 30 of the first component 22 so that torque is transferred between the second component 24 and the first component 22 during rotation of the rotor assembly 20 as shown in FIGS. 4 and 5. The second splines 34 extend radially outward in the illustrative embodiment.

Figure 7:
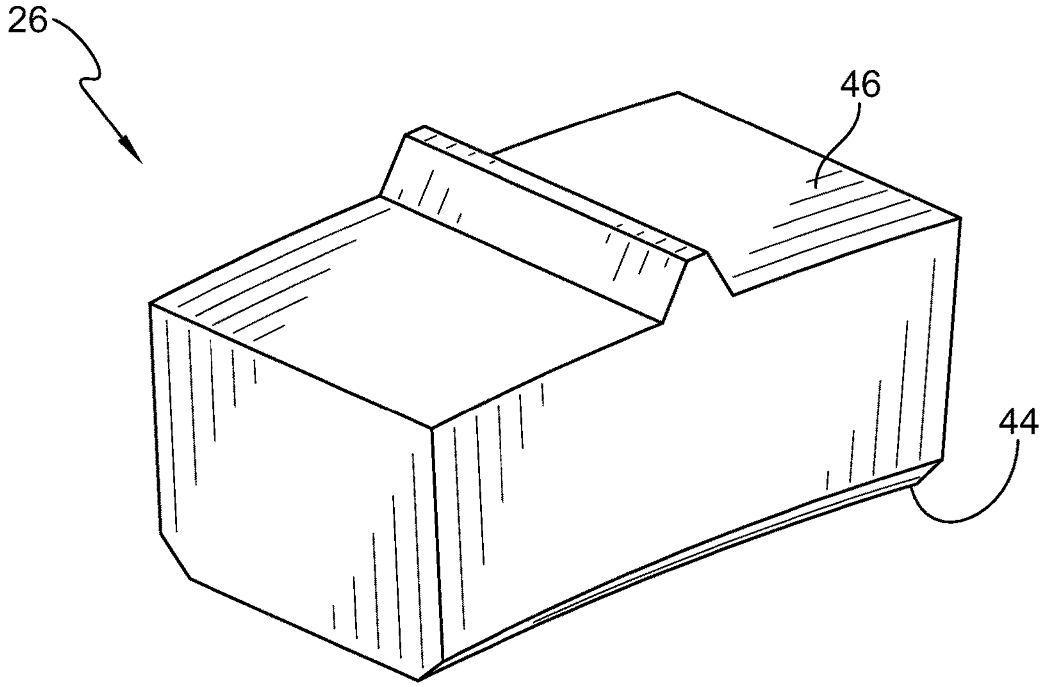
FIG. 7 is a perspective view of the splined balance weight of the rotor assembly showing that the splined balance weight is a discrete component and includes the spline tooth extending radially from the weight body along an axial length of the weight body.

The splined balance weight 26 includes a weight body 36 and a spline tooth 38 as shown in FIGS. 2 and 7. The weight body 36 extends circumferentially partway about the central axis 11. The spline tooth 38 extends radially from the weight body 36 and into the plurality of first splines 30 to interlock the splined balance weight 26 with the first component 22 and prevent circumferential movement of the splined balance weight 26 in relation to the first component 22 and the second component 24. In some embodiments, the splined balance weight 26 includes a plurality of spline teeth that extend radially outward and/or radially inward.

In the illustrative embodiment, a gap G is formed radially between the first band 28 of the first component 22 and the second band 32 of the second component 24 as shown in FIG. 2. A size of the gap G allows the splined balance weight 26 to be removed and separated from the first component 22 and the second component 24 while the first component 22 and the second component 24 are interlocked via the plurality of first splines 30 and the plurality of second splines 34. Because of the size of the gap G, the splined balance weight 26 may be removed from the rotor assembly 20 without disassembling the first component 22 from the second component 24.

The splined balance weight 26 may be moved to a different circumferential location. The splined balance weight 26 may be altered through the removal or addition of material and positioned back between the first component 22 and the second component 24. Additionally, a different splined balance weight may be inserted between the first component 22 and the second component 24 instead of or in addition to the splined balance weight 26.

Rotor assemblies may have an adjustment to the mass distribution of the assembly in order to balance and maintain an even weight distribution across the rotational axis. An uneven weight distribution of rotating components may cause unbalance such that the rotational center of the rotor assembly is out of alignment. Unbalance may impact the vibration and effectiveness of the rotor assembly.

Conventional methods, for example, hard corrections to the rotor assembly, such as machining away and removing extra material of a component, may be used to adjust the mass distribution of the rotor assembly. Such a technique results in a permanent modification to the rotor assembly. Other rotor assemblies may add components to a flange of the rotor assembly via fasteners.

In the illustrative embodiment, the splined balance weight 26 is used to balance the weight distribution of the rotor assembly 20. The spline tooth 38 of the splined balance weight 26 interlocks with the plurality of first splines 30 of the first component 22 so that a fastening mechanism, such as a through hole and a screw, are not used to maintain the position of the splined balance weight 26 in relation to the first component 22 and the second component 24.

Additionally, due to the gap G formed by the first band 28 of the first component 22 and the second band 32 of the second component 24, the splined balance weight 26 may be separated from the first component 22 and the second component 24 while the first component 22 and the second component 24 remain interlocked via the plurality of first splines 30 and the plurality of second splines 34, such that disassembling the first component 22 and the second component 24 is not necessary.

The ability to separate and remove the splined balance weight 26 from the rotor assembly 20 without disassembling the other components 22, 24 enables the splined balance weight 26 to be altered and/or moved to a different circumferential location to balance the rotor assembly 20.

Turning back to the first component 22 of the rotor assembly 20, the first component 22 includes the first band 28 and the plurality of first splines 30 as shown in FIG. 2. The first band 28 is defined by an inner radial surface of the first component 22. The plurality of first splines 30 extend radially inward from the first band 28 toward the second component 24. The plurality of first splines 30 are formed on the first component 22 circumferentially entirely around the central axis 11 as suggested in FIGS. 4 and 5. The plurality of first splines 30 extend axially a first distance A1 as shown in FIG. 2.

The first component 22 further includes a groove 40 as shown in FIGS. 2 and 3. The groove 40 is spaced apart axially from the plurality of first splines 30. The groove 40 extends radially outward from the first band 28 and extends circumferentially around the entire central axis 11.

The second component 24 of the rotor assembly 20 includes the second band 32, the plurality of second splines 34, and a shoulder 42 as shown in FIGS. 2 and 3. The second band 32 is defined by an outer radial surface of the second component 24. The shoulder 42 extends radially outward from the second band 32. The plurality of second splines 34 extend radially outward from the shoulder 42. The plurality of second splines 34 are received by and interlock with the plurality of first splines 30, as shown in FIGS. 4 and 5, so that torque is transferred between the second component 24 and the first component 22 during rotation of the rotor assembly 20.

The plurality of second splines 34 extend axially a second distance A2 as shown in FIG. 2. The second axial distance A2 is less than the first axial distance A1, which allows the plurality of first splines 30 to extend axially beyond the plurality of second splines 34 and interlock with the splined balance weight 26. The plurality of second splines 34 are provided on the shoulder 42 circumferentially entirely around the central axis 11 as suggested in FIGS. 4 and 5.

The gap G is formed radially between the first band 28 and the second band 32 as shown in FIG. 2. The gap G allows the splined balance weight 26 to be inserted and/or separated from the rotor assembly 20 while the plurality of first splines 30 are engaged with the plurality of second splines 34. The gap G extends circumferentially entirely around the central axis 11. The gap G is greater in size than a radial height of the entire splined balance weight 26. In some embodiments, the gap G is sized so that the splined balance weight 26, in one or more orientations, may be removed and separated from the first component 22 and the second component 24 without separating the splines of the first component 22 and the second component 24.

Figure 6:
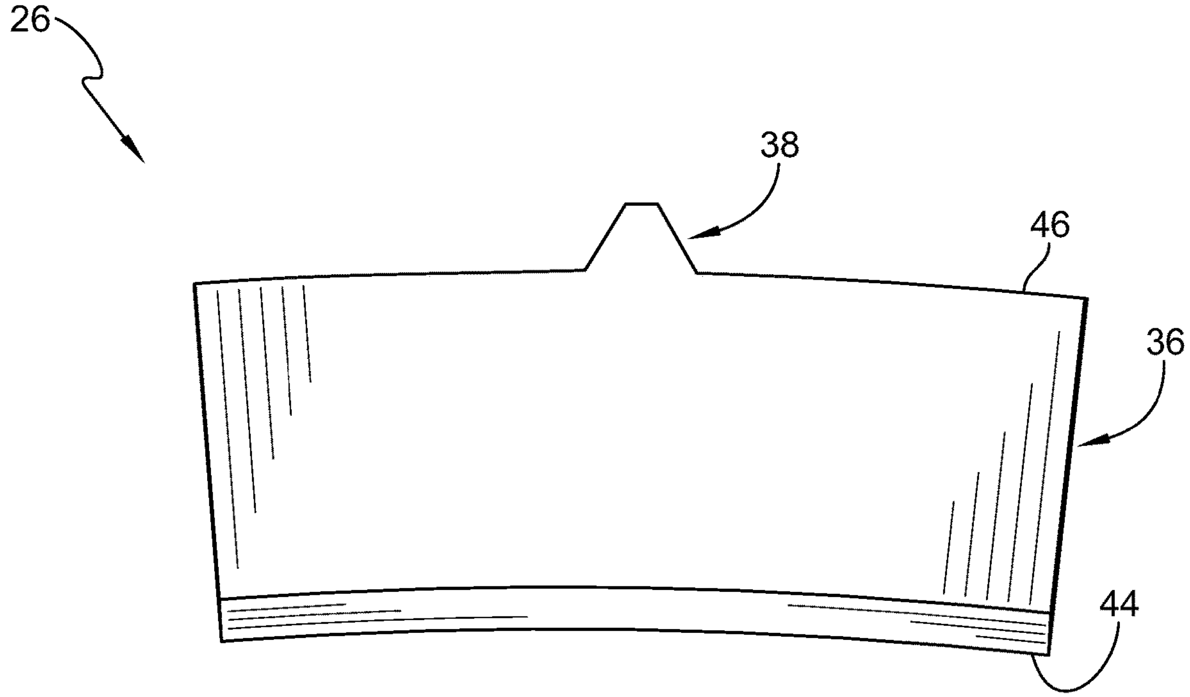
FIG. 6 is a side view of the splined balance weight of the rotor assembly showing that a spline tooth extends radially from a weight body of the splined balance weight and the weight body is an arcuate shape to match an arc formed by the first band of the first component and an arc formed by the second band of the second component.

The splined balance weight 26 includes the weight body 36 and the spline tooth 38 as shown in FIGS. 2, 6, and 7. The weight body 36 engages the shoulder 42 and the second band 32 of the second component 24. The spline tooth 38 extends radially outward from the weight body 36.

The weight body 36 includes a radial inner surface 44 and a radial outer surface 46 as shown in FIGS. 2, 4, and 7. The radial inner surface 44 is continuous such that the splined balance weight 26 is configured to slide axially along the second band 32 of the second component 24 and into position between the first component 22 and the second component 24. The weight body 36 is an arcuate shape with the radial outer surface 46 matching an arc formed by the first component 22 and the radial inner surface 44 matching an arc formed by the second band 32 of the second component 24 as shown in FIG. 4. The radial inner surface 44 of the weight body 36 engages the second band 32 of the second component 24 while the spline tooth 38 is received by the plurality of first splines 30. A first axial face 48 of the weight body 36 abuts the shoulder 42 of the second component 24 as shown in FIG. 2.

The spline tooth 38 is received by and interlocks with the plurality of first splines 30 of the first component 22 as shown in FIG. 4. Because the plurality of first splines 30 extend the first axial distance A1, and the plurality of second splines 34 extend the second axial distance A2 that is less than the first axial distance A1, the plurality of first splines 30 receive both the plurality of second splines 34 and the spline tooth 38 as shown in FIGS. 2 and 4.

The interlocking between the spline tooth 38 and the plurality of first splines 30 maintains the circumferential position of the splined balance weight 26 as shown in FIG. 4. The positioning of the splined balance weight 26 radially between the first component 22 and the second component 24 maintains the radial position of the splined balance weight 26. The spline tooth 38 of the splined balance weight 26 is circumferentially aligned with at least one spline of the plurality of second splines 34 as shown in FIG. 4.

The splined balance weight 26 is discrete and rigid as suggested in FIGS. 6 and 7. In some embodiments, the splined balance weight 26 is made of steel. The splined balance weight 26 may be made of a different material such that the splined balance weight 26 has an increased or decreased weight to fit the balancing needs of the rotor assembly 20. A circumferential arc length of the splined balance weight 26 may be increased or decreased to increase or decrease a weight of the splined balance weight 26. The splined balance weight 26 may include any number of spline teeth 38 that interlock with the plurality of first splines 30.

Multiple splined balance weights 26 may be included in the rotor assembly 20 depending on the balance requirements of the rotor assembly 20. The splined balance weights 26 may be placed at different circumferential locations within the rotor assembly 20. Each splined balance weight 26 may be identical, or each splined balance weight 26 may be different.

The rotor assembly 20 further includes a retention ring 50 spaced apart axially from the plurality of first splines 30 as shown in FIGS. 2 and 3. The retention ring 50 fits within the groove 40 of the first component 22. The retention ring 50 abuts a second axial face 52 of the weight body 36 that is opposite the first axial face 48. The retention ring 50 maintains the axial location of the splined balance weight 26 axially between the shoulder 42 of the second component 24 and the retention ring 50. The retention ring 50 blocks axial movement of the splined balance weight 26.

In the illustrative embodiment, the retention ring 50 is annular. The retention ring 50 may be a cylindrical shape or a coil shape.

The splined balance weight 26 may be separated from the first component 22 and the second component 24 as suggested in FIG. 5. After the retention ring 50 is removed from the groove 40 of the first component 22, the splined balance weight 26 is free for axial movement relative to the first component 22 and the second component 24. The radial inner surface 44 of the weight body 36 may slide axially on the second band 32 of the second component 24. The splined balance weight 26 may slide on the second band 32 through the gap G formed between the first band 28 and the second band 32.

A method of assembling the rotor assembly 20 of the gas turbine engine 10 may include several steps. The method includes arranging the first component 22 of the rotor assembly 20 circumferentially around the central axis 11. The first component 22 includes the first band 28 and the plurality of first splines 30 that extend radially from the first band 28.

The method further includes arranging the second component 24 of the rotor assembly 20 circumferentially around the central axis 11. The second component 24 includes the second band 32 and the plurality of second splines 34 that extend radially from the second band 32.

The method further includes interlocking the plurality of first splines 30 of the first component 22 with the plurality of second splines 34 of the second component 24. The method includes determining a balance offset of the rotor assembly 20 of the gas turbine engine 10.

The method further includes providing the splined balance weight 26 including the weight body 36 and the spline tooth 38 extending radially from the weight body 36. The method includes locating the splined balance weight 26 between the first component 22 and the second component 24 at a selected first circumferential position based on the balance offset of the rotor assembly 20.

The method further includes interlocking the spline tooth 38 of the splined balance weight 26 with one of the plurality of first splines 30 and the plurality of second splines 34. The method may further include positioning the retention ring 50 adjacent to the splined balance weight 26 to block the splined balance weight 26 axially between a portion of the second component 24 and the retention ring 50. The method may further include separating completely the splined balance weight 26 from the first component 22 and the second component 24 without separating the interlocked plurality of first splines 30 and the plurality of second splines 34.

The method may further include, after the separating step, at least one of (i) locating the splined balance weight 26 between the first component 22 and the second component 24 at a selected second circumferential position different from the first circumferential position, (ii) removing or adding material to the splined balance weight 26 and thereafter locating the splined balance weight 26 between the first component 22 and the second component 24, and (iii) providing a second splined balance weight different from the first splined balance weight 26 and locating the second splined balance weight between the first component 22 and the second component 24.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A rotor assembly adapted for a gas turbine engine, the rotor assembly comprising:

a first component arranged circumferentially around a central axis, the first component having a first band that extends at least partway circumferentially about the central axis and a plurality of first splines that extend radially from the first band, wherein the plurality of first splines are spaced circumferentially about the central axis, a second component arranged circumferentially around the central axis and located radially inward of the first component, the second component having a second band that extends at least partway circumferentially about the central axis and a plurality of second splines that extend radially from the second component, wherein the plurality of second splines are spaced circumferentially about the central axis, and the plurality of second splines interlock with the plurality of first splines of the first component so that torque is transferred between the second component and the first component during rotation of the rotor assembly, and a splined balance weight located radially between the first component and the second component and configured to balance a weight distribution of the rotor assembly, the splined balance weight including a weight body that extends circumferentially partway about the central axis and a spline tooth extending radially from the weight body and into the plurality of first splines to interlock the splined balance weight with the first component and prevent circumferential movement of the splined balance weight in relation to the first component and the second component, wherein the plurality of first splines includes a pair of adjacent first splines that are spaced circumferentially about the central axis to define a space between the pair of adjacent first splines, the spline tooth of the splined balance weight is discrete circumferentially about the central axis and includes a first surface and a second surface that is spaced circumferentially from the first surface about the central axis, and wherein the spline tooth extends radially into the space formed between the pair of adjacent first splines so that the first surface of the spline tooth is circumferentially positioned adjacent one of the pair of adjacent first splines and the second surface of the spline tooth is circumferentially positioned adjacent the other of the pair of adjacent first splines to interlock the splined balance weight with the first component to prevent circumferential movement of the splined balance weight about the central axis.

2. The rotor assembly of claim 1, wherein a gap is formed radially between the first band of the first component and the second band of the second component, and a size of the gap allows the splined balance weight to be separated from the first component and the second component while the first component and the second component are interlocked via the plurality of first splines and the plurality of second splines.

3. The rotor assembly of claim 2, wherein the plurality of first splines of the first component and the plurality of second splines of the second component are provided circumferentially entirely around the central axis, the gap extends circumferentially entirely around the central axis, the splined balance weight is discrete and rigid, and a radial inner surface of the weight body engages the second component while the spline tooth is received by the plurality of first splines.

4. The rotor assembly of claim 1, wherein the weight body of the splined balance weight is an arcuate shape that matches an arc formed by the first band of the first component and an arc formed by the second band of the second component.

5. The rotor assembly of claim 1, further comprising a retention ring spaced apart axially from the plurality of first splines to locate the splined balance weight axially between a portion of the second component and the retention ring to block axial movement of the splined balance weight.

6. The rotor assembly of claim 5, wherein the second component includes a shoulder extending radially outward from the second band and the shoulder abuts an axial face of the splined balance weight.

7. The rotor assembly of claim 6, wherein the splined balance weight is axially located between the shoulder of the second component and the retention ring and the weight body of the splined balance weight has a continuous radial inner surface that is configured to slide axially along a continuous radial outer surface of the second component.

8. The rotor assembly of claim 1, wherein the plurality of first splines of the first component extend a first axial distance, the plurality of second splines of the second component extend a second axial distance, and the first axial distance is greater than the second axial distance.

9. A rotor assembly adapted for a gas turbine engine, the rotor assembly comprising:

a first component arranged circumferentially around a central axis, the first component having a first band and a plurality of first splines that extend radially from the first band, a second component arranged circumferentially around the central axis, the second component having a second band and a plurality of second splines that extend radially from the second band and interlock with the plurality of first splines of the first component, a splined balance weight located radially between the first component and the second component, the splined balance weight including a weight body and a spline tooth extending radially from the weight body and into one of the plurality of first splines and the plurality of second splines, and a retention ring spaced apart axially from the plurality of first splines to locate the splined balance weight axially between a portion of the second component and the retention ring to block axial movement of the splined balance weight.

10. The rotor assembly of claim 9, wherein a gap is formed radially between the first band of the first component and the second band of the second component, and a size of the gap allows the splined balance weight to be separated from the first component and the second component while the first component and the second component are interlocked via the plurality of first splines and the plurality of second splines.

11. The rotor assembly of claim 10, wherein the plurality of first splines of the first component and the plurality of second splines of the second component are provided entirely around the central axis, the gap extends circumferentially entirely around the central axis, the splined balance weight is discrete and rigid, and a radial inner surface of the weight body engages the second component while the spline tooth is received by one of the plurality of first splines and the plurality of second splines.

12. The rotor assembly of claim 9, wherein the weight body of the splined balance weight is an arcuate shape that matches an arc formed by the first band of the first component and an arc formed by the second band of the second component.

13. The rotor assembly of claim 12, wherein the second component includes a shoulder extending radially outward from the second band and the shoulder abuts the splined balance weight.

14. The rotor assembly of claim 13, wherein the splined balance weight is axially located between the shoulder of the second component and the retention ring and the weight body of the splined balance weight has a continuous radial inner surface that is configured to slide axially along a continuous radial outer surface of the second component.

15. The rotor assembly of claim 9, wherein the plurality of first splines of the first component extend a first axial distance, the plurality of second splines of the second component extend a second axial distance, and the first axial distance is greater than the second axial distance.

16. A method comprising:

arranging a first component of a rotor assembly of a gas turbine engine circumferentially around a central axis, the first component having a first band and a plurality of first splines that extend radially from the first band, arranging a second component of the rotor assembly circumferentially around the central axis, the second component having a second band and a plurality of second splines that extend radially from the second band, interlocking the plurality of first splines of the first component with the plurality of second splines of the second component, determining a balance offset of the rotor assembly of the gas turbine engine, providing a splined balance weight including a weight body and a spline tooth extending radially from the weight body, locating the splined balance weight between the first component and the second component at a selected first circumferential position based on the balance offset of the rotor assembly, and interlocking the spline tooth of the splined balance weight with one of the plurality of first splines and the plurality of second splines, and positioning a retention ring adjacent to the splined balance weight to block the splined balance weight axially between a portion of the second component and the retention ring.

17. The method of claim 16, further including separating completely the splined balance weight from the first component and the second component without separating the interlocked plurality of first splines and the plurality of second splines.

18. The method of claim 17, further including, after the separating step, at least one of (i) locating the splined balance weight between the first component and the second component at a selected second circumferential position different from the first circumferential position, (ii) removing or adding material to the splined balance weight and thereafter locating the splined balance weight between the first component and the second component, and (iii) providing a second splined balance weight different from the first splined balance weight and locating the second splined balance weight between the first component and the second component.

* * * * *